United States Patent
Hong et al.

(10) Patent No.: US 11,684,883 B2
(45) Date of Patent: Jun. 27, 2023

(54) AIR PURIFIER INCLUDING BI-DIRECTIONAL FANS HAVING DIFFERENT DISCHARGE DIRECTIONS

(71) Applicant: COWAY CO., LTD., Gongju-si (KR)

(72) Inventors: Hyun Jin Hong, Seoul (KR); Sang Woo Kang, Seoul (KR); An Ho Cho, Seoul (KR)

(73) Assignee: COWAY CO., LTD., Gongju-si (KR)

(*) Notice: Subject to any disclaimer, the term of this patent is extended or adjusted under 35 U.S.C. 154(b) by 750 days.

(21) Appl. No.: 16/624,424

(22) PCT Filed: Jun. 19, 2018

(86) PCT No.: PCT/KR2018/006895
§ 371 (c)(1),
(2) Date: Dec. 19, 2019

(87) PCT Pub. No.: WO2018/236122
PCT Pub. Date: Dec. 27, 2018

(65) Prior Publication Data
US 2020/0129909 A1    Apr. 30, 2020

(30) Foreign Application Priority Data
Jun. 19, 2017   (KR) .................. 10-2017-0077541

(51) Int. Cl.
*F04D 29/42* (2006.01)
*F04D 25/10* (2006.01)
(Continued)

(52) U.S. Cl.
CPC ....... *B01D 46/0047* (2013.01); *F04D 17/162* (2013.01); *F04D 25/10* (2013.01); *F04D 25/16* (2013.01); *F04D 25/166* (2013.01); *F04D 29/422* (2013.01); *F04D 29/424* (2013.01); *F24F 8/10* (2021.01); *F24F 8/80* (2021.01);
(Continued)

(58) Field of Classification Search
CPC ...... F24F 8/10; F24F 13/20; F24F 8/80; F24F 11/77; F24F 13/10; B01D 46/0047; F04D 17/162; F04D 25/10; F04D 25/166; F04D 29/424
See application file for complete search history.

(56) References Cited

U.S. PATENT DOCUMENTS

2006/0078424 A1* 4/2006 Lee ..................... F04D 29/626
                                                        415/206

FOREIGN PATENT DOCUMENTS

CN    204963006 U    1/2016
CN    205089654 U    3/2016
(Continued)

OTHER PUBLICATIONS

PCT International Search Report dated Sep. 21, 2018 for International Application No. PCT/KR2018/006895; 2 Pages.
(Continued)

*Primary Examiner* — Eldon T Brockman
*Assistant Examiner* — Andrew J Marien
(74) *Attorney, Agent, or Firm* — Daly Crowley Mofford & Durkee, LLP (57) ABSTRACT

The present invention provides an air purifier including a plurality of bi-directional fans, which are arranged to be misaligned in a vertical direction such that the discharge directions of discharge ports are different from each other.

15 Claims, 9 Drawing Sheets

(51) Int. Cl.
    *F24F 8/80*     (2021.01)
    *B01D 46/00*     (2022.01)
    *F04D 25/16*     (2006.01)
    *F04D 17/16*     (2006.01)
    *F24F 8/10*     (2021.01)
    *F24F 13/20*     (2006.01)
    *F24F 11/77*     (2018.01)
    *F24F 13/10*     (2006.01)
    *F04D 29/70*     (2006.01)

(52) U.S. Cl.
    CPC ............ *F24F 13/20* (2013.01); *F04D 29/701* (2013.01); *F24F 11/77* (2018.01); *F24F 13/10* (2013.01)

(56) References Cited

FOREIGN PATENT DOCUMENTS

| JP | 63286629 | * | 5/1987 | ............... F24F 1/00 |
| JP | S 63-286629 A | | 11/1988 | |
| JP | 03-02021314 A2 | | 1/1991 | |
| JP | H 09-210390 A | | 8/1997 | |
| JP | 2000-320897 A | | 11/2000 | |
| JP | 2006-136808 A | | 6/2006 | |
| JP | 2008-039329 A | | 2/2008 | |
| JP | 2010-276296 A | | 12/2010 | |
| JP | 2013072583 | * | 9/2011 | ............... F24F 6/06 |
| JP | 2012-075667 A | | 4/2012 | |
| JP | 2013-072583 A | | 4/2013 | |
| JP | 2016-016340 A | | 2/2016 | |
| JP | 2016-125371 A | | 7/2016 | |
| JP | 2016-197673 A | | 11/2016 | |
| KR | 2016-0006274 A | | 1/2016 | |
| KR | 2016-0121664 A | | 10/2016 | |

OTHER PUBLICATIONS

Extended European Search Report dated Jan. 29, 2021 for European Application No. 18821302.9; 9 Pages.
Japanese Office Action dated Dec. 22, 2020 for Japanese Application No. 2019-568015; 10 Pages.

* cited by examiner

AIR PURIFIER INCLUDING BI-DIRECTIONAL FANS HAVING DIFFERENT DISCHARGE DIRECTIONS

CROSS REFERENCE TO RELATED APPLICATIONS

This present application is a national stage filing under 35 U.S.C § 371 of PCT application number PCT/KR2018/006895 filed on Jun. 19, 2018 which is based upon and claims the benefit of priority to Korean Patent Application No. 10-2017-0077541 filed on Jun. 19, 2017 in the Korean Intellectual Property Office. The disclosures of the above-listed applications are hereby incorporated by reference herein in their entirety.

TECHNICAL FIELD

The present invention relates to an air purifier including a plurality of bi-directional fans arranged to be misaligned in a vertical direction such that the discharge directions are different from each other.

BACKGROUND ART

An air purifier is a device that purifies air by intaking contaminant-laden air by a rotation of a fan, and filtering and then discharging the filtered air.

For such an air purifier, a single-directional fan is generally used. The single-directional fan takes in air from one of the left and right sides with respect to a rotation axis of the fan and discharges the air to the other side, and is disposed such that the discharge direction thereof faces toward an upper side of the air purifier with respect to the ground so that the outside air is taken in through a side of the air purifier and the filtered air is discharged vertically upwards the air purifier, resulting in the filtered air being convected throughout the space (such as rooms, living room, and the like) where the air purifier is positioned and purifying air.

One of the indices that indicates the performance of an air purifier is the capacity. The capacity, which may also be referred to as "air volume" or "area of use", may be metered in volume per hour (for example, 6.9 m$^3$/min) or in the area of the room (for example, 41.6 m$^2$). An air purifier with a larger capacity purifies a larger space with speed.

Many patents are known, regarding use of bi-directional fan to increase the capacity of such an air purifier. In these examples, the bi-directional fan is a fan that takes in air from both left and right sides with respect to the rotation axis of the fan and discharges the air to another side such as an upper side or a lower side.

JP2016-016340A discloses an air purifier including one bi-directional fan. JP2016-125371A discloses an air purifier including two bi-directional fans, with each bi-directional fan being designed to take in a greater amount of air by the centrifugal principle. CN205089654U discloses a vertical type air conditioner including two bi-directional fans, having the common principle of air intake as the air purifiers.

However, all of the relevant arts mentioned above are merely intended to increase the capacity of the air purifier or to increase the amount of air taken in by the air purifier.

For example, it is important that the air purifier with the bi-directional fan has the air intake area two times as large as that of the air purifier with the single-directional fan, while having the same air discharge port area, but the above relevant arts do not mention about contemplation on how to arrange and control the air discharge port or the discharge flow path thereof. In the relevant art, the bi-directional fans are simply stacked.

When the bi-directional fans are merely stacked, mutual interference may occur between the air discharged to the outside of the air purifier. When the interference occurs, the air forms a vortex, in which case the convection effect is reduced, and the air purifier capacity is not increased as desired, while noise and power consumption by the fan are increased.
(PTL 1) JP2016-016340A
(PTL 2) JP2016-125371A
(PTL 3) CN205089654U

DISCLOSURE

Technical Problem

The present invention has been made in order to solve the problems described above.

Specifically, an object of the present invention is to suggest an air purifier using two or more bi-directional fans, which can maximize the capacity increase effect, which is the advantage of the bi-directional fan, and also can improve customer satisfaction through various control modes, by effectively arranging intake ports and air discharge ports and adding a control mode specialized for the bi-directional fans.

Technical Solution

According to one embodiment of the present invention for solving the problems described above, there is provided an air purifier including a plurality of bi-directional fans, which are arranged to be misaligned in a vertical direction such that the discharge directions of discharge ports are different from each other.

In addition, it is preferable that the bi-directional fans include an upper bi-directional fan 110 and a lower bi-directional fan 120, and a discharge port 114 of the upper bi-directional fan 110 faces upward, and a discharge port of the lower bi-directional fan 120 is inclined from the vertical direction to face towards one side of the upper portion.

In addition, it is preferable that air discharged from the upper bi-directional fan 110 is discharged toward an upper portion of the air purifier, and air discharged from the lower bi-directional fan 120 is selectively discharged toward the upper portion of the air purifier or discharged toward one side of the air purifier.

In addition, it is preferable that the discharge port of the lower bi-directional fan 120 is in communication with a flow path 150 provided on one side of the air purifier, and a flow path switching member 155 is provided on the flow path 150.

In addition, it is preferable that the flow path 150 is in communication with an upper discharge port 130 positioned on an upper side of the air purifier and also with a side discharge port 140 positioned on one side of the air purifier.

In addition, when the flow path switching member 155 is in a first position, the discharge port of the lower bi-directional fan 120 is in communication with the upper discharge port 130, and when the flow path switching member 155 is in a second position, the discharge port of the lower bi-directional fan 120 is in communication with the side discharge port 140.

In addition, it is preferable that, in the first position, the flow path switching member 155 closes the side discharge port 140.

In addition, the discharge port of the upper bi-directional fan 110 is in communication with the upper discharge port 130.

In addition, it is preferable that, when the flow path switching member 155 is in the first position, air from the upper bi-directional fan 110 and air from the lower bi-directional fan 120 are discharged through the upper discharge port 130, and when the flow path switching member 155 is in the second position, the air from the upper bi-directional fan 110 is discharged through the upper discharge port 130 and the air from the lower bi-directional fan 120 is discharged through the side discharge port 140.

In addition, it is preferable that the RPM of the upper bi-directional fan 110 and the lower bi-directional fan 120 is controlled independently.

In addition, it is preferable that, in a fine dust purification mode or a remote purification mode of the air purifier, the flow path switching member 155 is controlled such that air from the lower bi-directional fan 120 is discharged to the upper discharge port 130 and the RPM of the upper bi-directional fan 110 is controlled to be further increased.

In addition, it is preferable that, in a large dust purification mode or a near-zone purification mode of the air purifier, the flow path switching member 155 is controlled such that air from the lower bi-directional fan 120 is discharged to the upper discharge port 130, and the RPM of the lower bi-directional fan 120 is controlled to be further increased.

In addition, it is preferable that, in a multi-room purification mode or a cooling mode of the air purifier, the flow path switching member 155 is controlled such that the air from the lower bi-directional fan 120 is discharged to the side discharge port 140.

In addition, it is preferable that the flow path switching member 155 is controlled in accordance with the RPM of the lower bi-directional fan 120.

In addition, it is preferable that, when the flow path switching member 155 is operated upward to cross the flow path 150, the RPM of the lower bi-directional fan 120 is increased.

In addition, it is preferable that the discharge directions of the discharge ports of the plurality of bi-directional fans are different from each other, and the bi-directional intake ports of the plurality of bi-directional fans are positioned on left and right sides of the air purifier.

In addition, it is preferable that a first intake port 112 of the upper bi-directional fan 110 and a first intake port 122 of the lower bi-directional fan 120 are positioned on one side of the air purifier, and a second intake port 113 of the upper bi-directional fan 110 and a second intake port 123 of the lower bi-directional fan 120 are positioned on the other side of the air purifier.

In addition, it is preferable that any one of a dehumidification module 193 and a humidification module 198 is positioned outside the first intake port 112 of the upper bi-directional fan 110, the second intake port 113 of the upper bi-directional fan 110, the first intake port 122 of the lower bi-directional fan 120, and the second intake port 123 of the lower bi-directional fan 120, respectively.

In addition, it is preferable that a flow path blocking member 199 is positioned outside the first intake port 112 of the upper bi-directional fan 110, the second intake port 113 of the upper bi-directional fan 110, the first intake port 122 of the lower bi-directional fan 120, and the second intake port 123 of the lower bi-directional fan 120, respectively.

In addition, it is preferable that one filter is positioned over the first intake port 112 of the upper bi-directional fan 110 and the first intake port 122 of the lower bi-directional fan 120, and the other filter is positioned over the second intake port 113 of the upper bi-directional fan 110 and the second intake port 123 of the lower bi-directional fan 120, and a filter frame is positioned only on outermost sides of the filters.

Advantageous Effects

According to the present invention, a large amount of air is taken in from four or more intake ports to be filtered and then discharged through two or more discharge ports, and accordingly, a high-capacity air purifier can be provided.

Various discharge modes are provided to the user through a misaligned arrangement, and various modes such as "fine dust purification mode", "large dust purification mode", "remote purification mode", and "near-zone purification mode", "multi-room purification mode", "cooling mode", and the like may be provided by controlling the RPM of the bi-directional fans independently and appropriately.

For example, it is possible to satisfy various intentions of the consumers, for example, to purify the air in a large area of space as a whole, to intensively purify only the air around the air purifier, to deal with a large amount of fine dusts, to concurrently implement the function of a cooling fan when the weather is hot, and so on.

The operation of the flow path switching member requires no or minimum power. This is useful not only to reduce power consumption, but also to reduce noise, which is one of the disadvantages of the air purifier.

One filter may be used to cover two or more intake ports positioned on the left and right sides. By covering two or more air intake ports with one filter, the entire area of the filter may be used evenly, thereby making it possible to use the largest possible area of the filter, and as a result, it is possible to solve the problem of having to replace the filter even when a large portion of the filter is not used.

The dehumidification module and the humidification module can be freely selected in each of two or more intake ports positioned on the left and right sides. Therefore, various functions related to moisture can be performed, such as an air purifier combined dehumidifier, an air purifier combined humidifier, an air purifier combined dehumidifier/humidifier, and the like.

BEST MODE FOR INVENTION

Hereinafter, "fine dust" refers to dust having a particle diameter of 10 μm or less, and dust having a particle size larger than that of the fine dust is referred to as "large dust". The term "dust" as used herein is to be understood as the concept that includes not only dust, but also various pollutants suspended in the atmosphere.

Hereinafter, "RPM" of the fan means rotation per minute of the fan, and controlling the RPM of the fan comprehensively means controlling the rotation of the fan by controlling the power of the fan or using other members.

Hereinafter, by "upper" or "upper side", it means the upper direction or side with reference to the paper on which the air purifier is illustrated, and by "lower" or "lower side", it means the lower direction or side with reference to the paper, and a direction connecting the upper and lower portions is referred to as "vertical direction". Hereinafter, the present invention will be described with reference to the drawings.

1. Description of Air Purifier

The air purifier according to the present invention includes a plurality of bi-directional fans arranged to be misaligned in a vertical direction such that the discharge directions of the discharge ports are different from each other.

In this example, when the "discharge directions are arranged to be misaligned in the vertical direction", it means that, while the upper bi-directional fan 110 and the lower bi-directional fan 120 are in a substantially similar structure to each other when viewed individually (see FIG. 2), the two bi-directional fans 110 and 120 are not disposed in the same direction when actually disposed, but arranged to be misaligned to cause the discharge directions of the respective discharge ports 114 and 124 to be at a predetermined angle from each other. That is, the discharge direction of the discharge port 114 of the upper bi-directional fan 110 and the discharge direction of the discharge port 124 of the lower bi-directional fan 120 are disposed to form a predetermined angle with respect to each other, instead of being in the same direction with reference to the vertical direction.

Figure 4:
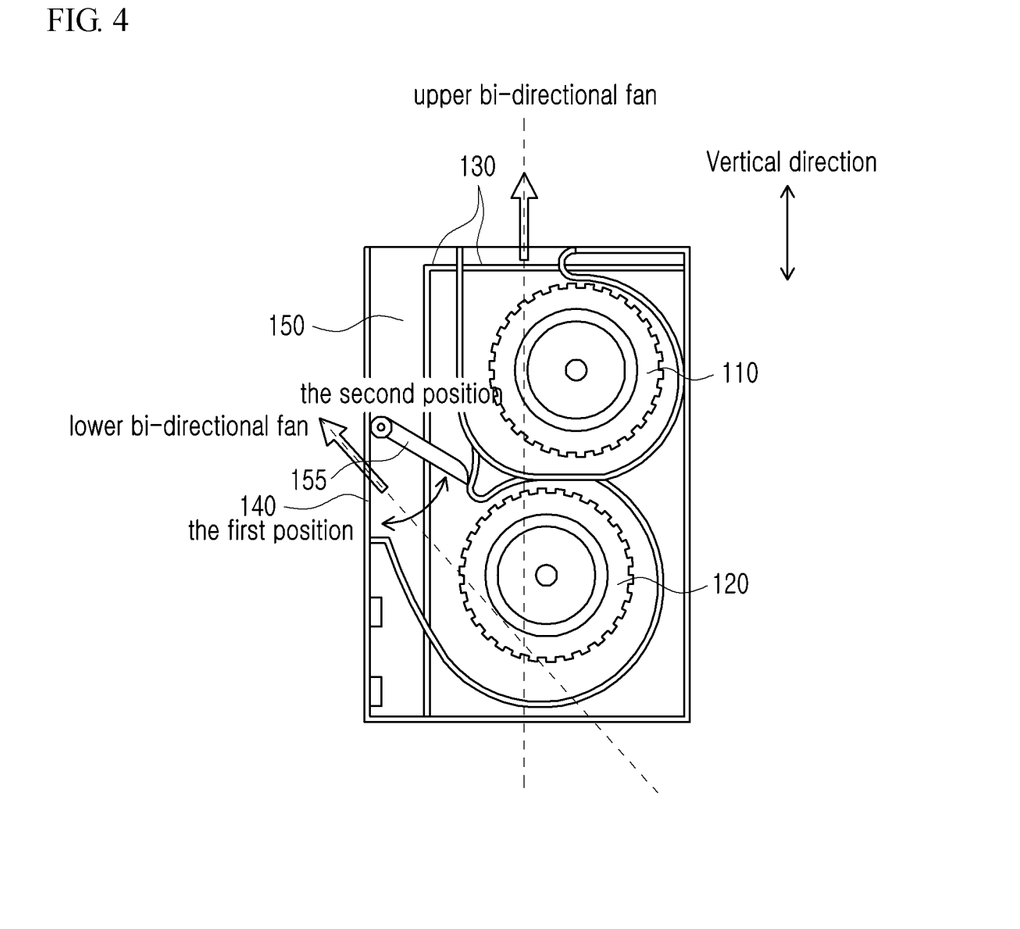
FIG. 4 is a cross-sectional view showing an air purifier according to the present invention.

In the drawings, the air purifier including two bi-directional fans 110 and 120 is shown, but there may be three or more bi-directional fans. Note that, in the above case, the discharge directions of the respective bi-directional fans also have to be misaligned from each other in the vertical direction. For example, as shown in FIG. 4, the bi-directional fans have to be disposed such that, when the discharge direction of the uppermost bi-directional fan faces upward, the discharge direction of the bi-directional fan disposed below the uppermost bi-directional fan is inclined laterally away from the vertical direction instead of facing upward, and the discharge direction of the bi-directional fan disposed below that bi-directional fan is inclined laterally at a further distance away from the vertical direction. Hereinafter, exemplary embodiment will be described by referring to an example in which two bi-directional fans are provided.

1.1 Arrangement of Bi-Directional Fans and Structure of Air Purifier

Figure 1:
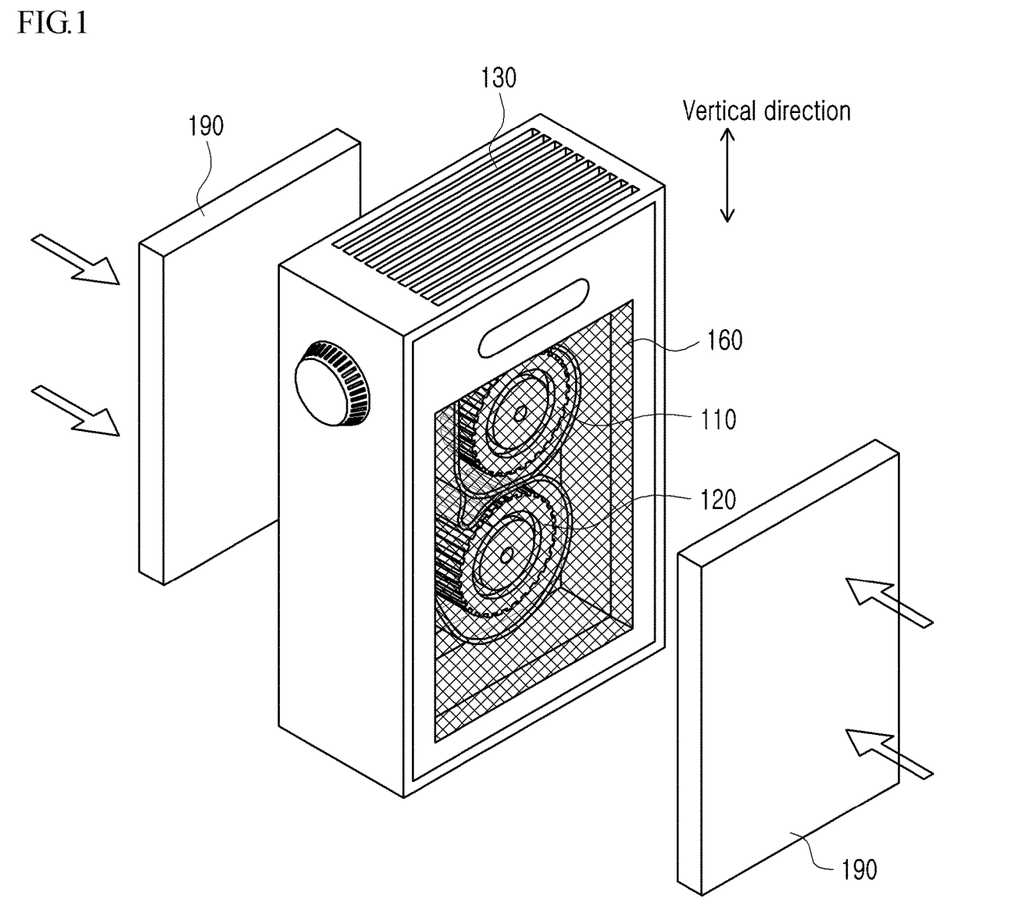
FIG. 1 schematically shows an air purifier according to the present invention. For the sake of explanation, flow paths are not illustrated, while a dehumidification module and a humidification module are briefly illustrated.
Figure 3:
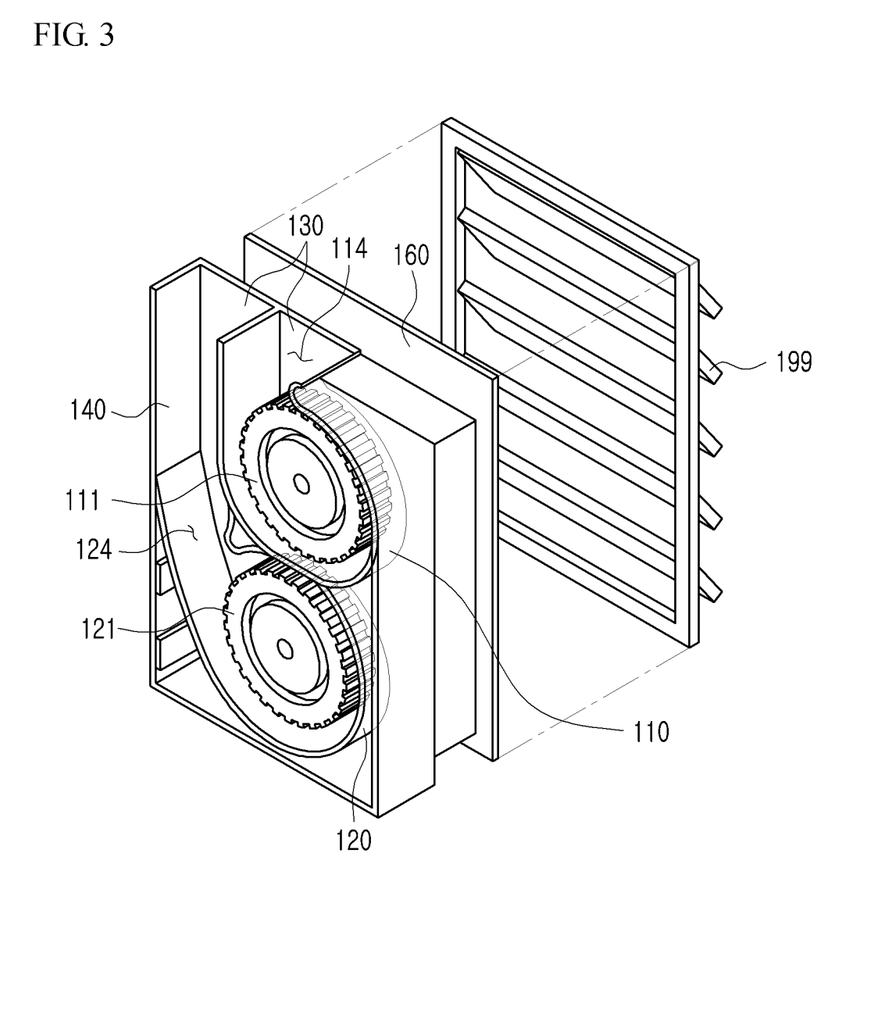
FIG. 3 is a cross-sectional perspective view schematically showing an air purifier according to the present invention. For the sake of explanation, a flow path switching member is not illustrated.

As shown in FIGS. 1, 3, and 4, the air purifier includes an upper bi-directional fan 110 and a lower bi-directional fan 120. The bi-directional fans are arranged to be misaligned in the vertical direction such that the discharge directions are different from each other, in which the upper bi-directional fan 110 is positioned such that a discharge port 114 thereof faces upward, and the lower bi-directional fan 120 is positioned to be inclined from the vertical direction such that a discharge port 124 thereof faces towards one side of the upper portion.

Figure 2:
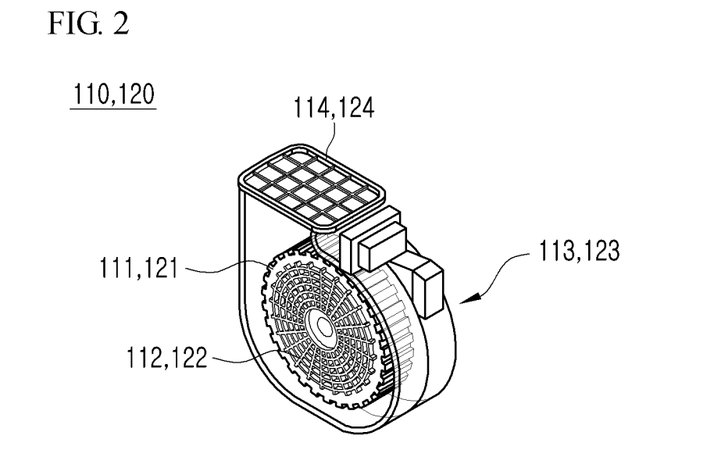
FIG. 2 schematically shows an upper bi-directional fan and a lower bi-directional fan used in the present invention.

As shown in FIG. 2, the upper bi-directional fan 110 and the lower bi-directional fan 120 may be configured with the same structure. The upper bi-directional fan 110 includes a fan 111, a first intake port 112 and a second intake port 113 positioned on the left and right sides of the fan 111, and a discharge port 114 through which air is discharged. Likewise, the lower bi-directional fan 120 also includes a fan 121, a first intake port 122 and a second intake port 123 positioned on the left and right sides of the fan 121, and a discharge port 124 through which air is discharged.

The discharge port of the air purifier includes an upper discharge port 130 positioned on the upper side and a side discharge port 140 positioned on the side.

As shown in FIGS. 4 and 6 to 9, the upper discharge port 130 is in communication with the upper bi-directional fan 110 and the flow path 150, and the side discharge port 140 is provided on one side of the flow path 150. Accordingly, the air discharged from the upper bi-directional fan 110 is directly discharged at a high wind pressure toward the upper portion of the air purifier through the upper discharge port 130, while the air discharged from the lower bi-directional fan 120 is selectively discharged together toward the upper discharge port 130 toward the upper portion of the air purifier through the flow path 150 or discharged toward the side discharge port 140 toward one side of the air purifier through the flow path 150.

In other words, the air discharged from the lower bi-directional fan 120 flows into the flow path 150, and then is discharged through the upper discharge port 130 by the flow path switching member 155, or discharged by passing through the side discharge port 140. That is, by the operation of the flow path switching member 155, the direction of discharging the air from the lower bi-directional fan 120 to the outside of the air purifier is switched to the upper side or one side.

1.2 Flow Path Switching Member

The flow path switching member 155 operates between a first position and a second position. As shown in FIG. 4, in the first position, the flow path switching member 155 closes the side discharge port 140 such that the discharge port of the lower bi-directional fan 120 is in communication with the upper discharge port 130, and in the second position, the flow path switching member 155 crosses the flow path 150 such that the discharge port of the lower bi-directional fan 120 is in communication with the side discharge port 140.

In the drawing, the flow path switching member 155 is shown as a flap that pivots about a rotation axis fixed on the air purifier, but it goes without saying that it may be any structure that is capable of changing the direction of flow in the flow path.

When the flow path switching member 155 is in the first position (see FIGS. 6, 7, and 8), the discharge port of the lower bi-directional fan 120 is in communication with the upper discharge port 130 through the flow path 150. As a result, the air discharged from the lower bi-directional fan 120 is discharged to the upper portion of the air purifier. In this case, the air from the upper bi-directional fan 110 and the air from the lower bi-directional fan 120 are discharged together through the upper discharge port 130. As described above, the air discharged from the upper bi-directional fan 110 is discharged at high wind pressure since it is not passed through the flow path 150, and the air passed through the lower bi-directional fan 120 and the flow path 150 is added thereto.

When the flow path switching member 155 is in the second position (see FIGS. 4 and 9), the discharge port of the lower bi-directional fan 120 is in communication with the side discharge port 140 through the flow path 150. Accordingly, the air discharged from the lower bi-directional fan 120 is discharged to one side of the air purifier. In this case, only the air from the upper bi-directional fan 110 is discharged through the upper discharge port 130, and the air from the lower bi-directional fan 120 is discharged through the side discharge port 140. That is, the air purifier discharges air through both the upper side and the side portion. Of course, when the upper bi-directional fan 110 is controlled to not operate at this position, the air purifier will discharge air only through one side.

In an embodiment, when the flow path switching member 155 is in the first position, the flow path switching member 155 itself may be configured to close the side discharge port 140. In this case, without requiring use of a separate closing member, it is possible to prevent the external air containing contaminants from flowing into the air purifier through the side discharge port 140.

In another embodiment, the RPMs of the upper bi-directional fan 110 and the lower bi-directional fan 120 may be independently controllable as described below, so that a motor required for operating the flow path switching member 155 may be omitted or power thereof may be reduced by using the RPM of the lower bi-directional fan 120. As a result, it is possible to reduce power consumption, remove or reduce noise, and prolong the lifetime of the motor.

For example, when the flow path switching member 155 is operated upward so as to cross the flow path 150 (operated from the first position to the second position), the RPM of the lower bi-directional fan 120 may be controlled to be increased accordingly, so that it is possible to reduce the power required therefor, by allowing the flow path switching member 155 to be operated upward naturally.

For another example, increasing the RPM of the lower bi-directional fan 120 alone may cause the flow path switching member 155 to be automatically operated upward to cross the flow path 150 by the wind pressure. That is, a configuration may be provided in which, when it is necessary to move the flow path switching member 155 upward, the RPM of the lower bi-directional fan 120 is increased, thereby causing the flow path switching member 155 to be moved upward to reach the second position by the wind pressure, and at this time, the flow path switching member 155 is locked into a locking member (not shown) to be fixed in the second position.

Meanwhile, in the example described above, it is shown that the flow path switching member 155 is operated only in one of the first position and the second position, but in another example, the flow path switching member 155 may be operated to its intermediate position. In this case, the air discharged from the lower bi-directional fan 120 may be discharged through both the upper side and the side portion of the air purifier.

1.3 Intake Ports

The bi-directional intake ports of the plurality of bi-directional fans are disposed to be commonly positioned on left and right sides of the air purifier. In the embodiment illustrated herein, the first intake port 112 of the upper bi-directional fan 110 and the first intake port 122 of the lower bi-directional fan 120 are commonly positioned on the left side, which is one side of the air purifier, and the second intake port 113 of the upper bi-directional fan 110 and the second intake port 123 of the lower bi-directional fan 120 are commonly positioned on the right side which is the other side of the air purifier. Since there are two intake ports commonly positioned on the left and right sides, respectively, only one filter 160 is required for each of the left and right sides. That is, one filter is positioned over the first intake port 112 of the upper bi-directional fan 110 and the first intake port 122 of the lower bi-directional fan 120, and the other filter is positioned over the second intake port 113 of the upper bi-directional fan 110 and the second intake port 123 of the lower bi-directional fan 120.

The filter 160 preferably has a filter frame positioned only on the outermost side so that there is no filter frame crossing the center. That is, rather than being formed in a shape "H", the filter frame is formed in a shape "⊓" and the filter is positioned inside. In the related art where one filter is used for one intake port, the filters are often replaced while the filter adjacent to the filter frame is not fully utilized. However, by configuring the filter frame as described above, the entire area of the filter is utilized evenly by the two intake ports, and as a result, the unused space is reduced, and the lifetime of the filter is increased.

In addition, the dehumidification module 193 and the humidification module 198 may be freely selected and positioned outside the first intake port 112 and the second intake port 113 of the upper bi-directional fan 110 and the first intake port 122 and the second intake port 123 of the lower bi-directional fan 120 (that is, outside the four intake ports).

Figure 5:
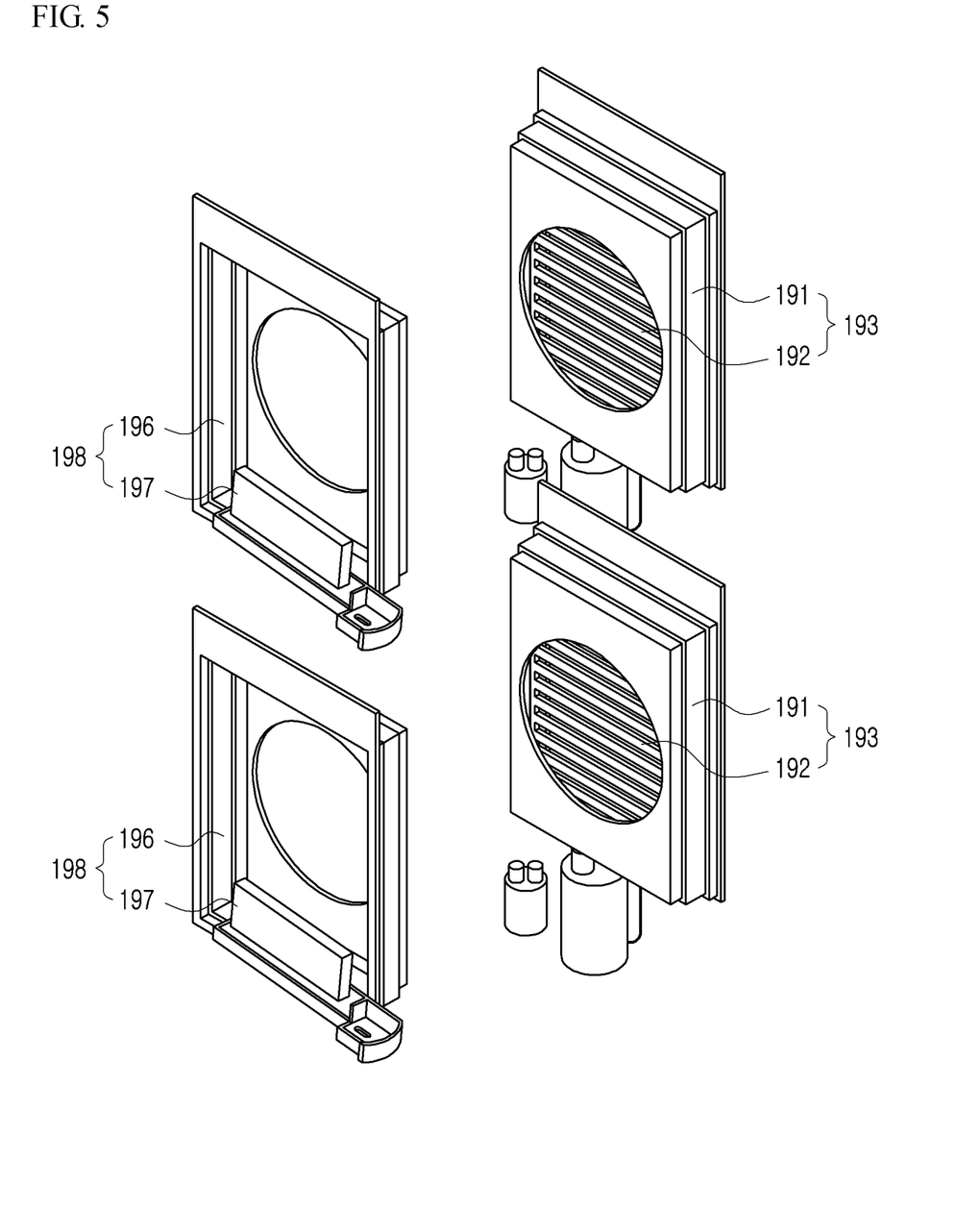
FIG. 5 shows a dehumidification module and a humidification module that can be provided in an air purifier according to the present invention. For the sake of explanation, a body of an air purifier is not illustrated, except for a dehumidification module and a humidification module.

As shown in FIG. 5, one dehumidification module 193 may include a heat exchanger 192 provided in a dehumidification module housing 191, and one humidification module 198 may include a humidification filter 197 provided in a humidification module housing 196. It goes without saying that various dehumidification and humidification modules may be implemented, such as, a heat transfer module may be provided instead of the heat exchanger, an ultrasonic humidifier may be provided instead of the humidification filter, and so on.

In FIG. 5, although it is shown that the dehumidification module 193 is provided on the two left intake ports, and the humidification module 198 is provided on the two right intake ports, as described above, various modifications are possible, such as, a dehumidification module may be provided at the upper two intake ports and a humidification module may be provided at the lower two intake ports, or provided to cross each other, and so on.

Meanwhile, the flow path blocking members 199 may be positioned on the outermost sides of the first intake port 112 and the second intake port 113 of the upper bi-directional fan 110 and the first intake port 122 and the second intake port 123 of the lower bi-directional fan 120 (that is, on the outermost sides of the four intake ports), respectively. In this case, a total of four flow path blocking members 199 are controlled to enable intensive air purification.

For example, when the flow path blocking member 199 blocks the two left and right upper intake ports, intensive air purification at the lower portion is possible, whereas, when the flow path blocking member 199 blocks the two left and right lower intake ports, intensive air purification at the upper portion is possible. That is, when the flow path blocking member 199 is used, air inflow into one of the fans may be controlled without requiring the operation of a power member for applying power to the upper bi-directional fan 110 and the lower bi-directional fan 120.

1.4 Independent Control of Bi-Directional Fans

In the air purifier according to the present invention, the RPMs of the plurality of bi-directional fans with the discharge directions being arranged to be misaligned in the vertical direction may be controlled independently. In the illustrated embodiment, the RPMs of the upper bi-directional fan 110 and the lower bi-directional fan 120 are controlled independently. This is possible by independently controlling a power member (not shown) connected to each fan, or by opening and closing the flow path blocking member 199 described above.

With this, it is possible to implement various modes, such as a mode to intensively purify the fine dust at the upper portion, a mode to intensively purify the large dust at the lower portion, a mode to discharge the clean air farther, and so on.

Various modes with the independent control are described in detail below.

2. Various Air Purification Modes

In the air purifier according to the present invention, the operation of the flow path switching member 155, the on/off control or RPM control of the upper bi-directional fan 110 and the lower bi-directional fan 120, the operation of the flow path blocking member 199, and the like may be combined to provide the user with various air purification modes.

Figure 6:
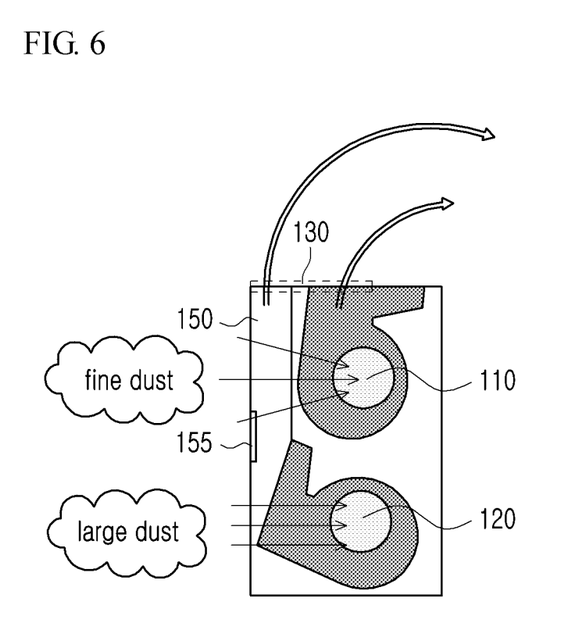
FIGS. 6 to 9 show various modes of an air purifier according to the present invention.

FIG. 6 illustrates a general mode in which the upper bi-directional fan 110 and the lower bi-directional fan 120 are controlled at substantially the same RPM, based on which various modes are possible as described below.

2.1 "Fine Dust Purification Mode" and "Remote Purification Mode"

Figure 7:
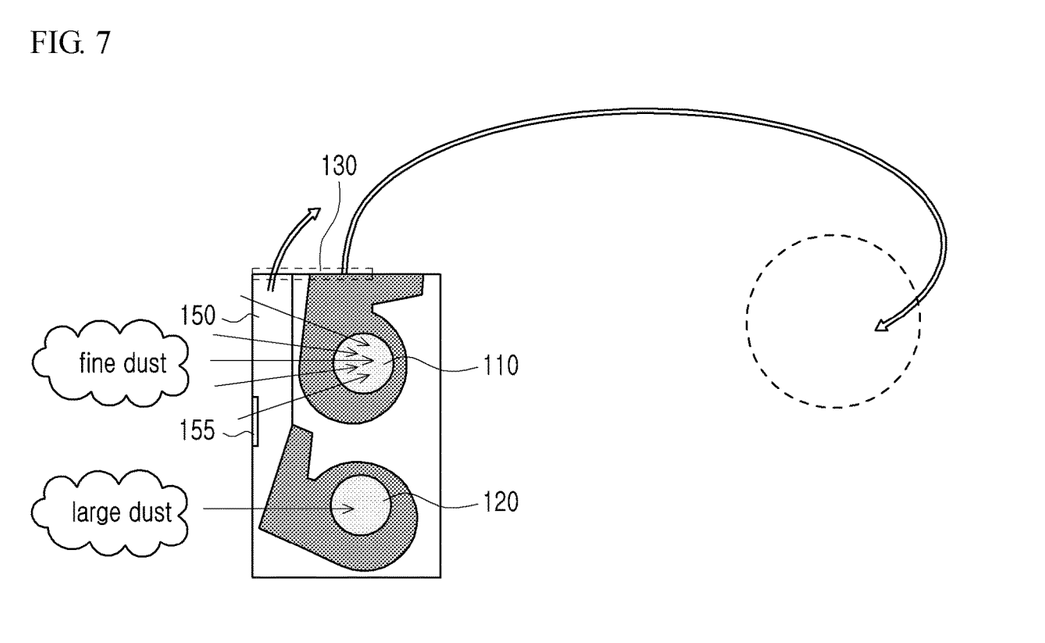

FIG. 7 shows a "fine dust purification mode" and a "remote purification mode".

In general, fine dust has a smaller particle size than large dust, and so floats to a certain height without sinking in the vicinity of the ground. Therefore, in order to intensively purify the fine dust, the upper bi-directional fan 110 is operated with a higher RPM.

On the other hand, since the air discharged from the upper bi-directional fan 110 is discharged directly through the upper discharge port 130 without passing through the flow path 150, the air flows relatively far compared to the lower bi-directional fan 120 controlled with the same RPM. As a result, the purified air may be blown to a farther position in the space and convected.

Therefore, even when the user wants to implement the "remote purification mode", it is possible to operate the upper bi-directional fan 110 with a higher RPM.

Further, in this case, the lower bi-directional fan 120 discharges the air through the upper discharge port 130 rather than the side discharge port 140, thereby contributing to the remote purification.

2.2 "Large Dust Purification Mode" and "Near-Zone Purification Mode"

Figure 8:
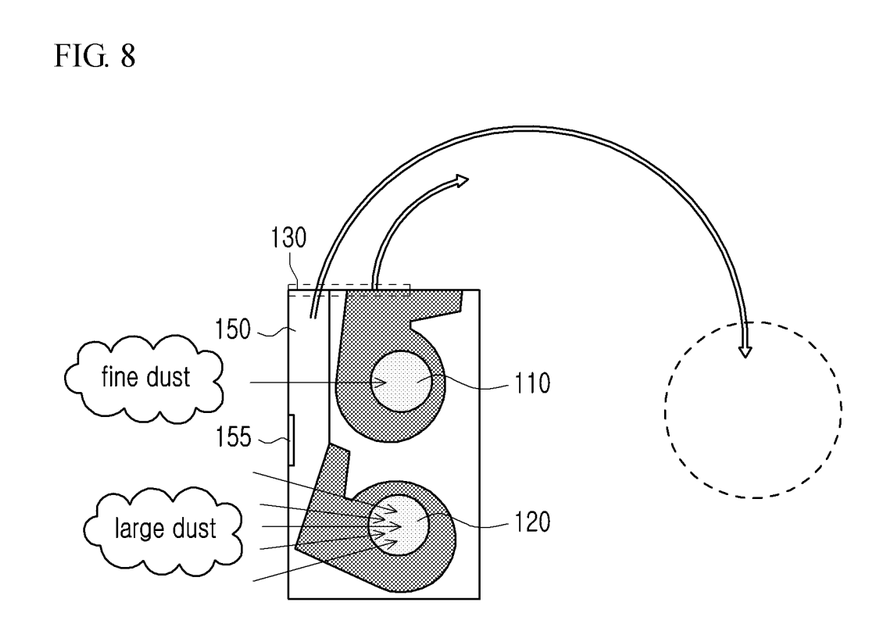

FIG. 8 shows the "large dust purification mode" and the "near-zone purification mode".

The large dust sinks in the vicinity of the ground due to its particle size. In order to intensively purify the large dust, the lower bi-directional fan 120 is operated with a higher RPM.

In an embodiment, the air purifier includes a fine dust sensor, and may be implemented in the "fine dust purification mode" described above when the amount of fine dust is greater than a predetermined reference value, and may be implemented in the "large dust purification mode" when the amount is less than the predetermined reference value.

Meanwhile, conversely to the remote purification mode, the lower bi-directional fan 120 is operated with a higher RPM, thus enabling implementation of the near-zone purification mode. In this case, for the convection effect, it is preferable that the lower bi-directional fan 120 discharges the air through the upper discharge port 130 rather than the side discharge port 140.

2.3 Multi-Room Purification Mode and Cooling Mode

Figure 9:
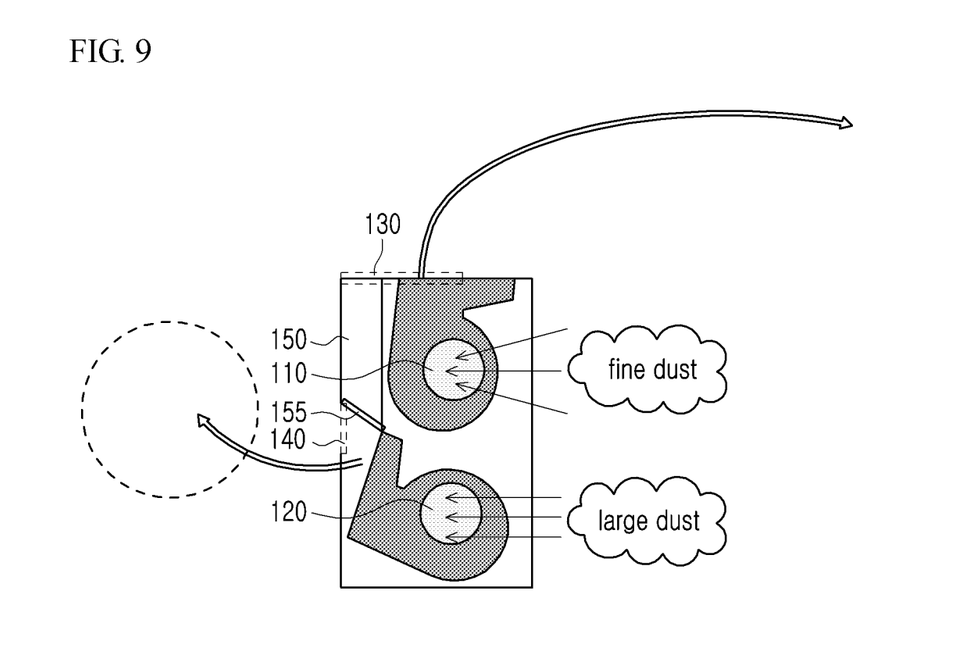

FIG. 9 shows a "multi-room purification mode" or a "cooling mode".

The difference from the modes described above with reference to FIGS. 6, 7 and 8 is that the flow path switching member 155 is operated such that the air discharged from the lower bi-directional fan 120 is discharged to the side rather than to the upper side.

That is, unlike the purification method of the conventional general air purifier in which the purified air discharged from the lower bi-directional fan 120 rises high in the space and moves and then descends to convect the air in the space, or unlike the "remote purification mode" and "near-zone purification mode" described above, in the "multi-room purification mode", the purified air discharged from the lower bi-directional fan 120 is directly discharged through the side toward the user.

In this case, when it comes to the ability to convect the air throughout the space as a whole, the "multi-room purification mode" is relatively inferior compared to the general mode of FIG. 6, but is suitable for discharging the purified air to the vicinity of the air purifier in a crowded space with a higher speed, thus enabling implementation of the "multi-room purification mode".

In addition, by directly spraying air toward the user, the air purifier may be used as a fan during the summer, thus realizing a "cooling mode".

While six modes have been described herein by way of examples, various modes which are not described are applicable.

For example, a "left air intensive purification mode" or "right air intensive purification mode" that opens only the intake port on one side by using the flow path blocking member 199 may be possible, or selective or automatic dehumidification/humidification modes, and the like may also be possible. In these cases too, the dehumidification or humidification may be automatically performed in accordance with a predetermined humidity.

It will be apparent to those skilled in the art that various modifications and variations can be made to the present invention without departing from the spirit and scope of the present invention as defined by the following claims and their equivalents. Accordingly, the scope of protection of the present invention should be determined by the claims.

DESCRIPTION OF REFERENCE NUMERALS

110 upper bi-directional fan
111 fan
112 first intake port
113 second intake port
114 discharge port
120 lower bi-directional fan
121 fan
122 first intake port
123 second intake port
124 discharge port
130 upper discharge port
140 side discharge port
150 flow path
155 flow path switching member
160 filter
190 dehumidification/humidification module
191 dehumidification module housing
192 heat exchanger
193 dehumidification module
196 humidification module housing 197 humidification filter
198 humidification module
199 flow path blocking member

The invention claimed is:

1. An air purifier comprising:
   a plurality of bi-directional fans, which are arranged to be misaligned in a vertical direction such that discharge directions of discharge ports are different from each other; and
   a flow path provided on one side of the air purifier and in communication with an upper discharge port positioned on an upper side of the air purifier and a side discharge port positioned on a side of the air purifier,
   wherein the bi-directional fans include an upper bi-directional fan and a lower bi-directional fan,
   wherein a discharge port of the upper bi-directional fan faces upward, and a discharge port of the lower bi-directional fan is inclined from the vertical direction to face towards one side of an upper portion;
   the discharge port of the lower bi-directional fan is in communication with the flow path;
   wherein air discharged from the upper bi-directional fan is discharged toward the upper discharge port; and
   wherein air discharged from the lower bi-directional fan is selectively discharged toward the upper discharge port or the side discharge port depending on an operation of a flow path switching member provided on the flow path,
   wherein the discharge directions of the discharge ports of the plurality of bi-directional fans are different from each other, and bi-directional intake ports of the plurality of bi-directional fans are positioned on left and right sides of the air purifier.

2. The air purifier according to claim 1, wherein, when the flow path switching member is in a first position, the discharge port of the lower bi-directional fan is in communication with the upper discharge port, and
   when the flow path switching member is in a second position, the discharge port of the lower bi-directional fan is in communication with the side discharge port.

3. The air purifier according to claim 2, wherein, in the first position, the flow path switching member closes the side discharge port.

4. The air purifier according to claim 2, wherein the discharge port of the upper bi-directional fan is in communication with the upper discharge port.

5. The air purifier according to claim 4, wherein, when the flow path switching member is in the first position, the air from the upper bi-directional fan and the air from the lower bi-directional fan are discharged through the upper discharge port, and
   when the flow path switching member is in the second position, the air from the upper bi-directional fan is discharged through the upper discharge port and the air from the lower bi-directional fan is discharged through the side discharge port.

6. The air purifier according to claim 1, wherein RPMs of the upper bi-directional fan and the lower bi-directional fan are independently controlled.

7. The air purifier according to claim 6, wherein, in the air purifier, the flow path switching member is controlled such that the air from the lower bi-directional fan is discharged to the upper discharge port in fine dust purification mode or remote purification mode, and RPM of the upper bi-directional fan is controlled to be further increased.

8. The air purifier according to claim 6, wherein, in the air purifier, the flow path switching member is controlled such that the air from the lower bi-directional fan is discharged to the upper discharge port in a large dust purification mode or a near-zone purification mode, and RPM of the lower bi-directional fan is controlled to be further increased.

9. The air purifier according to claim 6, wherein, in the air purifier, the flow path switching member is controlled such that the air from the lower bi-directional fan is discharged to the side discharge port in a multi-room purification mode or a cooling mode.

10. The air purifier according to claim 1, wherein the flow path switching member is controlled in accordance with RPM of the lower bi-directional fan.

11. The air purifier according to claim 10, wherein, when the flow path switching member is operated upward to cross the flow path, RPM of the lower bi-directional fan is increased.

12. The air purifier according to claim 1, wherein a first intake port of the upper bi-directional fan and a first intake port of the lower bi-directional fan are positioned on the one side of the air purifier, and
   a second intake port of the upper bi-directional fan and a second intake port of the lower bi-directional fan are positioned on another side of the air purifier.

13. The air purifier according to claim 12, wherein any one of a dehumidification module and a humidification module is positioned outside the first intake port of the upper bi-directional fan, the second intake port of the upper bi-directional fan, the first intake port of the lower bi-directional fan, and the second intake port of the lower bi-directional fan, respectively.

14. The air purifier according to claim 12, wherein a flow path blocking member is positioned outside the first intake port of the upper bi-directional fan, the second intake port of the upper bi-directional fan, the first intake port of the lower bi-directional fan, and the second intake port of the lower bi-directional fan, respectively.

15. The air purifier according to claim 12, wherein one filter is positioned over the first intake port of the upper bi-directional fan and the first intake port of the lower bi-directional fan, another filter is positioned over the second intake port of the upper bi-directional fan and the second intake port of the lower bi-directional fan, and a filter frame is positioned only on outermost sides of the filters.

* * * * *